(12) United States Patent
Koda et al.

(10) Patent No.: US 11,149,121 B2
(45) Date of Patent: Oct. 19, 2021

(54) METHOD FOR PRODUCING COMPOSITE RESIN PARTICLES, RESIN MOLDED ARTICLE, AND COMPOSITE RESIN PARTICLES

(71) Applicant: TAIYO NIPPON SANSO CORPORATION, Tokyo (JP)

(72) Inventors: Yasuhito Koda, Nirasaki (JP); Kentaro Miyoshi, Kai (JP); Katsunori Takada, Kai (JP); Toru Sakai, Tokyo (JP)

(73) Assignee: Taiyo Nippon Sanso Corporation, Tokyo (JP)

( * ) Notice: Subject to any disclaimer, the term of this patent is extended or adjusted under 35 U.S.C. 154(b) by 64 days.

(21) Appl. No.: 16/616,645

(22) PCT Filed: Jun. 27, 2018

(86) PCT No.: PCT/JP2018/024265
§ 371 (c)(1),
(2) Date: Nov. 25, 2019

(87) PCT Pub. No.: WO2019/004235
PCT Pub. Date: Jan. 3, 2019

(65) Prior Publication Data
US 2020/0199306 A1 Jun. 25, 2020

(30) Foreign Application Priority Data
Jun. 28, 2017 (JP) .............................. JP2017-126604

(51) Int. Cl.
| | |
|---|---|
| *C08J 3/205* | (2006.01) |
| *C08J 3/12* | (2006.01) |
| *C08K 7/06* | (2006.01) |
| *C08J 3/215* | (2006.01) |
| *C08J 3/21* | (2006.01) |
| *C08K 3/04* | (2006.01) |

(52) U.S. Cl.
CPC ............... *C08J 3/2053* (2013.01); *C08J 3/12* (2013.01); *C08J 3/124* (2013.01); *C08J 3/128* (2013.01); *C08J 3/212* (2013.01); *C08J 3/215* (2013.01); *C08K 7/06* (2013.01); *C08J 2327/18* (2013.01); *C08K 3/041* (2017.05)

(58) Field of Classification Search
CPC ... C08J 3/2053; C08J 3/12; C08J 3/128; C08J 3/215; C08J 3/212; C08J 3/124; C08J 2327/18; C08K 7/06; C08K 3/041
See application file for complete search history.

(56) References Cited

U.S. PATENT DOCUMENTS

2003/0027066 A1   2/2003  Yamashita et al.

FOREIGN PATENT DOCUMENTS

| JP | 63-101430 | 5/1988 |
|---|---|---|
| JP | 2014-034591 | 2/2014 |
| JP | 2015-030821 | 2/2015 |
| JP | 2015-151543 | 8/2015 |
| WO | 2017/022229 | 2/2017 |

OTHER PUBLICATIONS

Machine English translation of JP S63-101430, Yoshida et al., May 1988.*
Search Report issued in EP App. No. 18825350.4 (dated Feb. 2, 2021).
International Search Report for PCT/JP2018/024265, dated Sep. 11, 2018, 2 pages.

* cited by examiner

*Primary Examiner* — Patrick D Niland
(74) *Attorney, Agent, or Firm* — Nixon & Vanderhye P.C.

(57) ABSTRACT

An object of the present invention is to produce composite resin particles in which the original physical properties of PTFE derived from fine powder are maintained, and the present invention provides a method for producing composite resin particles, wherein the method includes: a first step in which fine powder containing polytetrafluoroethylene obtained by emulsion polymerization is pulverized in the presence of a ketone-based solvent; a second step in which the pulverized fine powder and a carbon nanomaterial are dispersed in the ketone-based solvent to produce a composite resin particles dispersion; a third step in which the composite resin particles are produced by removing the ketone-based solvent from the composite resin particle dispersion; and wherein the fine powder is pulverized so as to have an average particle diameter of 50 μm or less, and a temperature of the ketone-based solvent used in the first step is set to 20° C. or less.

6 Claims, No Drawings

METHOD FOR PRODUCING COMPOSITE RESIN PARTICLES, RESIN MOLDED ARTICLE, AND COMPOSITE RESIN PARTICLES

This application is the U.S. national phase of International Application No. PCT/JP2018/024265 filed 27 Jun. 2018, which designated the U.S. and claims priority to JP Patent Application No. 2017-126604 filed 28 Jun. 2017, the entire contents of each of which are hereby incorporated by reference.

FIELD OF THE INVENTION

The present invention relates to a method for producing composite resin particles, a resin molded article, and composite resin particles.

DESCRIPTION OF RELATED ART

Carbon nanomaterials such as carbon nanotubes (hereinafter also referred to as "CNT") are excellent in various physical properties such as crystallinity, conductivity, and thermal conductivity, and are widely put into practical use. Composite resin particles including a carbon nanomaterial and a resin material are used in molded articles used for electronic parts, automobile parts and the like.

Examples of the resin material include polytetrafluoroethylene (hereinafter also referred to as "PTFE") which is a polymer of tetrafluoroethylene (hereinafter also referred to as "TFE"). PTFE is a resin excellent in moldability, mechanical strength, heat resistance, flexibility and the like.

However, since PTFE has electric insulation properties, it is necessary to impart conductivity depending on the application.

Therefore, in order to impart conductivity to PTFE using the excellent conductivity of the carbon nanomaterial, composite resin particles containing carbon nanomaterial and PTFE have been developed (Patent Document 1).

Patent Document 1 discloses a method for producing composite resin particles in which PTFE powder with a particle diameter of about 1 to 100 μm which is called molding powder and CNT with a length of about 1 to 100 μm are dispersed in a ketone-based solvent or the like to produce composite resin particle dispersion, and the ketone-based solvent is removed from the composite resin particle dispersion. The molding powder is powder containing PTFE obtained by suspension polymerization of TFE.

PTFE powder includes fine powder in addition to the molding powder. The fine powder is powder containing PTFE obtained by the emulsion polymerization of TFE. In general, the fine powder has a particle diameter of about 500 μm, which is larger than a particle diameter of the molding powder, and is not suitable for forming the composite resin particles with carbon nanomaterial.

However, the fine powder is easy to handle when working such as drying, weighing, packing, and transferring. The fine powder is also easy to handle in an auxiliary agent mixing process and a mold filling process in an extrusion molding.

Patent Document 2 discloses a method in which the fine powder is pulverized together with a filler in the presence of carbon dioxide gas, and the fine powder and the filler are uniformly mixed, and an aggregate of PTFE and the filler is produced. Patent Document 2 also discloses a method for producing molding powder having a desired particle diameter by adding a solvent to the aggregate obtained by the method above and moistening.

PRIOR ART DOCUMENTS

Patent Literature

Patent Document 1: Japanese Unexamined Patent Application, First Publication No. 2015-30821

Patent Document 1: Japanese Unexamined Patent Application, First Publication No. 2015-151543

DISCLOSURE OF THE INVENTION

Problem to be Solved by the Invention

However, even when the technique described in Patent Document 1 is applied to the fine powder, CNTs hardly adhere to the surface of the fluororesin particles. This is because the surface of the fluororesin fine powder has less irregularities and a larger particle diameter than those of the molding powder, that is, the specific surface area of the fluororesin particles that can come into contact with the CNTs is small. Since the CNTs hardly adhere to the surface of the fluororesin particles, there are many CNTs that do not adhere to the surface of the fluororesin particles. Therefore, a large number of CNTs remaining without adhering are mixed as aggregates in the composite resin particles obtained by collecting and drying the mixed slurry of the CNT dispersion and the fluororesin powder.

As described above, defects such as cracks occur in a molded article of the composite resin particles obtained by the method described in Patent Document 1 due to the aggregation of CNTs. Furthermore, the mechanical properties of such molded articles are significantly reduced, and the conductivity of the molded articles is also unstable.

The method described in Patent Document 2 is a method for producing composite resin particles containing a filler by so-called dry mixing. However, the dry mixing does not disperse the CNT bundle, and the filler and the fine powder cannot be combined at the mono-disperse level. Therefore, even if the composite resin particles are produced with the CNT concentration of about 0.2% by mass in the method of Patent Document 2, conductivity or the like cannot be imparted to the composite resin particles.

Further, in the method described in Patent Document 2, a large amount of graphite powder of 30% by mass is used. For this reason, the molded article of the composite resin particles obtained by this method has poor physical properties such as flexibility.

From the above, the method described in Patent Document 2 has problems that desired conductivity cannot be obtained unless a large amount of CNT is used, and if a large amount of CNT is used, excellent properties such as the flexibility that fine powder originally has are reduced.

The present invention has been made in view of the above circumstances, and an object of the present invention is to produce composite resin particles in which the original physical properties of PTFE derived from fine powder are maintained.

Means to Solve the Problem

The present invention includes the following aspects.

[1] A method for producing composite resin particles, wherein the method includes:
a first step in which fine powder containing polytetrafluoroethylene obtained by emulsion polymerization is pulverized in the presence of a ketone-based solvent;
a second step in which the pulverized fine powder and a carbon nanomaterial are dispersed in the ketone-based solvent to produce a composite resin particles dispersion;
a third step in which the composite resin particles are produced by removing the ketone-based solvent from the composite resin particle dispersion; and
wherein the fine powder is pulverized so as to have an average particle diameter of 50 μm or less, and a temperature of the ketone-based solvent used in the first step is set to 20° C. or less.

[2] The method for producing composite resin particles according to [1], wherein a concentration of the carbon nanomaterial is 0.01 to 0.5% by mass with respect to a total of 100% by mass of the carbon nanomaterial and the fine powder.

[3] The method for producing composite resin particles according to [1] or [2], wherein the ketone-based solvent contains at least one selected from the group consisting of 2-butanone, acetone, diethyl ketone, methyl propyl ketone, and cyclohexanone.

[4] The method for producing composite resin particles according to any one of [1] to [3], wherein the carbon nanomaterial is a carbon nanotube.

[5] Resin molded article molded using composite resin particles produced by the method for producing composite resin particles according to any one of [1] to [4]

[6] Composite resin particles containing polytetrafluoroethylene derived from fine powder containing polytetrafluoroethylene obtained by emulsion polymerization, and a carbon nanomaterial, and a volume resistivity of the composite resin particles is $1.0 \times 10^9$ Ω·cm or less.

Effects of the Invention

According to the present invention, it is possible to produce composite resin particles in which a carbon nanomaterial uniformly adheres to PTFE derived from the fine powder while maintaining the physical properties of PTFE derived from fine powder.

DETAILED DESCRIPTION OF THE INVENTION

The following definitions of terms apply throughout the present description and the claims.

"Average particle diameter" is a median diameter ($d_{50}$) in a cumulative distribution.

"Volume resistivity" is a value measured by a four-terminal method using a resistivity meter ("Loresta GPMCP-T610 type" manufactured by Mitsubishi Chemical Analytech Co., Ltd.).

"Composite resin particle dispersion" means a dispersion in which the composite resin particles are dispersed in a liquid medium.

"Composite resin particles" mean composite particles composed of a resin and a carbon nanomaterial.

[Method for Producing Composite Resin Particles]

Hereinafter, a method for producing composite resin particles, which is an embodiment according to the present invention, will be described. The method for producing composite resin particles of the present embodiment includes a first step, a second step, and a third step.

The first step is a step of pulverizing fine powder containing polytetrafluoroethylene obtained by the emulsion polymerization (hereinafter sometimes simply referred to as "fine powder") in the presence of a ketone-based solvent.

The second step is a step of obtaining a composite resin particle dispersion by dispersing the fine powder pulverized and a carbon nanomaterial in the ketone-based solvent.

The third step is a step of obtaining the composite resin particles by removing the ketone-based solvent from the composite resin particle dispersion.

The method for producing composite resin particles according to the present embodiment is characterized in that the first step is performed before the second step, the fine powder is pulverized such that the average particle diameter is 50 μm or less in the first step, and the temperature of the ketone-based solvent in the first step is set to 20° C. or less. Hereinafter, the method for producing composite resin particles according to the present embodiment will be described in detail in the order of each step.

(First Step)

Hereinafter, the first step of the method for producing composite resin particles of the present embodiment will be described.

The first step is a step of pulverizing fine powder in the presence of a ketone-based solvent.

Examples of the ketone-based solvents include, but are not limited to, 2-butanone, acetone, diethyl ketone, methyl propyl ketone, and cyclohexanone. As the ketone-based solvent, a synthesized product or a commercially available product may be used.

The fine powder is powder containing PTFE obtained by the emulsion polymerization. Such fine powder can be synthesized by a known method. The method for synthesizing the fine powder is not particularly limited. As an example, there is a method of emulsion-polymerizing TFE using a stabilizer and an emulsifier, agglomerating particles in a reaction solution obtained by the emulsion polymerization to obtain particles having a diameter of about several hundred μm, and then drying.

As the fine powder, a synthesized powder or a commercially available product may be used.

Examples of commercially available fine powder include "PTFE fine powder grade F-104 (average particle diameter: about 500 μm)" manufactured by Daikin Industries, Ltd., but are not limited thereto.

The fine powder can be pulverized by applying mechanical energy.

In general, the molecular chain of PTFE contained in the fine powder is folded by the emulsion polymerization in production. In the molecular chain of such fine powder, the folded molecular chain tends to extend under conditions higher than 20° C. By extending the folded molecular chain, properties such as physical properties derived from PTFE inherent to the fine powder are changed.

The first step of the method for producing composite resin particles of the present embodiment is characterized in that the shearing force applied to the fine powder during pulverizing is suppressed. By suppressing the shear force, heat generated during shearing can be reduced, and the folded structure of the molecular chain of PTFE can be maintained.

The method for pulverizing the fine powder is not particularly limited as long as the shear force applied to the powder particles of the fine powder is suppressed. Examples of the pulverization method include, but are not limited to, stirring using a stirrer, pulverization using ultrasonic waves, and pulverization using a known pulverizer such as a food processor.

Although the average particle diameter of the fine powder as a raw material cannot be generally specified, it is preferably about 400 to 500 µm from the viewpoint of workability in the pulverizing process. If the average particle diameter of the fine powder is about 400 to 500 µm, it is not necessary to give an excessive amount of energy to the fine powder during pulverizing, and it becomes easy to pulverize to a predetermined average particle diameter.

In the first step of the method for producing composite resin particles of the present embodiment, the fine powder is pulverized so that the average particle diameter is 50 µm or less. By pulverizing the fine powder such that the average particle diameter is 50 µm or less in the first step, the irregularities on the surface of the fluororesin particles of the fine powder are increased, the specific surface area is increased, and the surface that can be contacted with the carbon nanomaterial is increased. Thereby, the contact probability of the carbon nanomaterial and the fine powder increases, and it becomes easy to increase the amount of the carbon nanomaterial which can adsorb to the particle surface of the fine powder. Therefore, when the fine powder has an average particle diameter of 50 µm or less, it becomes easy to uniformly adsorb and impregnate the carbon nanomaterial on the surface of the fine powder, and it is easy to reduce the generation of the aggregate of the carbon nanomaterial.

In the first step of the method for producing composite resin particles of the present embodiment, it is preferable to pulverize the fine power such that the average particle diameter is 5 µm or more. When the fine power is pulverized such that the average particle diameter is 5 µm or more in the first step, the specific surface area of the fine powder does not increase too much, and the amount of the carbon nanomaterial relative to the fine powder is unlikely to be insufficient. Therefore, in the fine powder surface area, the area where the carbon nanomaterial adsorbs and the area where the carbon nanomaterial does not adsorb are difficult to be distributed, and the conductivity is easily stabilized.

In summary, when the fine power is pulverized such that the average particle diameter is in a range of 5 µm to 50 µm in the first step, the carbon nanomaterial can be uniformly adhered to the surface of the fine powder, the appearance uniformity is high. It is also easy to produce the composite resin particles that can provide molded articles with good conductivity.

In the first step of the method for producing composite resin particles of the present embodiment, the temperature of the ketone-based solvent is set to 20° C. or lower. In another example of the method for producing composite resin particles of the present embodiment, the temperature of the ketone-based solvent is set to 10° C. or lower in the first step. By setting the temperature of the ketone-based solvent to 20° C. or lower in the first step, it is possible to produce the composite resin particles in which the carbon nanomaterial uniformly adheres to the fine powder while maintaining the excellent physical properties of the fine powder.

Since the first step of the method for producing composite resin particles of the present embodiment is carried out in the presence of the ketone-based solvent, the wet mixing can be carried out. In the method for producing composite resin particles of the present embodiment, it is possible to pulverize the fine powder at 20° C. or less by cooling the ketone-based solvent. For this reason, the method for producing composite resin particles of the present embodiment is a simple method compared with the method of cooling the fine powder in the dry mixing. An example of a method for setting the temperature of the ketone-based solvent to 20° C. or lower includes, but is not limited to, an ice bath and the like.

In the method for producing composite resin particles of the present embodiment, the first step is performed before the second step. By performing the first step before the second step, the carbon nanomaterial used in the second step is likely to adhere uniformly to the surface layer of the particles made of PTFE in the fine powder, and the carbon nanomaterial can be fixed to the fine powder. Thereby, the dispersibility of the composite resin particle dispersion obtained in the second step is improved.

In the method for producing composite resin particles according to the present embodiment, by selecting an appropriate pulverizing method in the first step, the average particle diameter of the fine powder can be reduced to 50 µm or less without the folded molecular chain of the fine powder extending. Therefore, the carbon nanomaterial can easily adhere uniformly to the fine powder while maintaining the excellent physical properties of the fine powder.

In an example of the method for producing composite resin particles of the present embodiment, in the first step, a resin slurry in which the fine powder is dispersed in the ketone-based solvent can be obtained by pulverizing the fine powder in the presence of the ketone-based solvent.

(Second Step)

Hereinafter, the second step of the method for producing composite resin particles of the present embodiment will be described.

The second step is a step of obtaining a composite resin particle dispersion by dispersing the fine powder pulverized in the first step and the carbon nanomaterial in the ketone-based solvent.

The "composite resin particles" means the composite resin particles generated in the second step.

The composite resin particles include PTFE derived from the fine powder and the carbon nanomaterial. The composite resin particle dispersion is a liquid in which the composite resin particles containing PTFE derived from fine powder and the carbon nanomaterial are dispersed in the ketone-based solvent.

The carbon nanomaterial is a material having an aligned carbon six-membered ring structure. The average length of the carbon nanomaterial cannot be generally specified, but is preferably 10 to 600 µm. When the average length of the carbon nanomaterial is equal to or more than the lower limit value, the obtaining composite resin particles are likely to have excellent conductivity. When the average length of carbon nanomaterial is equal to or less than the upper limit value, the carbon nanotubes tend to adhere uniformly to the obtaining fine powder.

Examples of the carbon nanomaterial include, but are not limited to, carbon nanofiber, carbon nanohorn, carbon nanocoil, graphene, fullerene, acetylene black, ketchon black, carbon black, and carbon fiber.

Of the carbon nanomaterials, fullerene, acetylene black, ketchon black, and carbon black are substantially spherical. In the case of a substantially spherical carbon nanomaterial, the average length means the average particle diameter.

It is preferable that the composite resin particles generated in the second step of the method for producing composite resin particles of the present embodiment be such that the carbon nanomaterial is uniformly attached to the surface layer of the particles containing PTFE derived from the fine powder. Thereby, excellent properties derived from PTFE such as moldability and mechanical properties can be maintained, and the conductivity of the composite resin particles can be stabilized.

In an example of the method for producing composite resin particles of the present embodiment, the carbon nanomaterial used in the second step may be dispersed in the ketone-based solvent. The carbon nanomaterial used in the second step may be, for example, a CNT dispersion in which CNT that is the carbon nanomaterial is dispersed in the ketone-based solvent such as 2-butanone.

In an example of the method for producing composite resin particles of the present embodiment, the resin slurry obtained in the first step and the CNT dispersion may be mixed in the second step. Thereby, the composite resin particle dispersion can be obtained.

In an example of the method for producing composite resin particles of the present embodiment, the composite resin particle dispersion may be obtained by so-called wet mixing. When the wet mixing is used, the bundle of the carbon nanomaterial is easy to disperse, and PTFE derived from the fine powder and the carbon nanomaterial can be combined in a state close to mono-dispersion.

In an example of the method for producing composite resin particles according to the present embodiment, the carbon nanomaterial can be uniformly adhered and fixed to the surface layer of PTFE resin particles derived from fine powder in a state close to mono-dispersion. Therefore, in the example of the method for producing composite resin particles according to the present embodiment, conductivity can be imparted to the composite resin particles even when the carbon nanomaterial with an extremely low concentration is used.

In an example of the method for producing composite resin particles of the present embodiment, the concentration of the carbon nanomaterial is 0.01 to 0.5% by mass with respect to 100% by mass in total of the carbon nanomaterial and the fine powder. When the concentration of the carbon nanomaterial is equal to or more than the lower limit value, it is easy to impart conductivity to the composite resin particles. When the concentration of the carbon nanomaterial is equal to or less than the upper limit value, excellent physical properties such as moldability and mechanical properties of the fine powder can be maintained as they are.

In an example of the method for producing composite resin particles of the present embodiment, by using a very small amount of the carbon nanomaterial for the fine powder, conductivity can be imparted to the obtaining composite resin particles, and excellent physical properties such as moldability and mechanical properties of the fine powder can be maintained as they are.

In the semiconductor field, there is a strong demand for reducing filler dust generation and outgassing. According to the example of the method for producing composite resin particles of the present embodiment described above, the amount of carbon nanomaterial used is small, so that the risk of contamination caused by the carbon nanomaterial in the production process can be reduced.

In the second step of one example of the method for producing composite resin particles of the present embodiment, a known dispersant may be used when the fine powder pulverized in the first step and the carbon nanomaterial are dispersed in the ketone-based solvent. Examples of the dispersant include known dispersants such as acrylic dispersants, but are not limited thereto.

(Third Step)

Hereinafter, the third step of the method for producing composite resin particles of the present embodiment will be described. The third step is a step of obtaining the composite resin particles by removing the ketone-based solvent from the composite resin particle dispersion prepared in the second step. The method for removing the ketone-based solvent from the composite resin particle dispersion may be a known solvent removal method such as solid-liquid separation, and is not particularly limited.

In an example of the method for producing composite resin particles of the present embodiment, the composite resin particle dispersion can be supplied to a spray dryer device by a slurry pump and dried to obtain the composite resin particles. The dried powder can be collected to obtain composite resin particles.

The composite resin particle dispersion may be dried by a known drying method such as vacuum drying, heat drying, and natural drying, and the drying method, but is not limited thereto.

(Function and Effect)

According to the method for producing composite resin particles of the present embodiment described above, the first step is performed before the second step, so that it is possible to produce the composite resin particles in which the carbon nanomaterial is uniformly adhered to the fine powder.

Moreover, according to the method for producing composite resin particles of the present embodiment, the fine powder is pulverized in the first step so that the average particle diameter is 50 μm or less, and the temperature of the ketone-based solvent is set to 20° C. or less. Therefore, the folded molecular chain of the fine powder can be prevented from extending, and the physical properties of the fine powder are hardly impaired.

Moreover, in the method for producing composite resin particles of the present embodiment, in order not to produce the aggregates of CNT, before mixing the fine powder and CNT, the fine powder is pulverized, and the average particle diameter is made into 50 μm or less. Therefore, according to the method for producing composite resin particles of the present embodiment, the irregularities on the surface of the fine powder are increased, the area that can adsorb CNTs is increased, and CNTs are easily adhered uniformly.

Therefore, according to the method for producing composite resin particles of the present embodiment, the composite resin particles in which the original physical properties of PTFE derived from fine powder are maintained can be produced.

[Resin Molded Article]

Hereinafter, a resin molded article which is an embodiment according to the present invention will be described. The resin molded article of the present embodiment is a resin molded article molded using the composite resin particles produced according to the description in the section of "[Method for Producing Composite Resin Particles]" of the present embodiment described above.

In such composite resin particles, the carbon nanomaterial is uniformly attached to PTFE derived from the fine powder. Therefore, the resin molded article of the present embodiment can have excellent appearance uniformity in addition to excellent physical properties derived from the fine powder such as moldability and mechanical properties.

According to the resin molded article of the present embodiment, it is possible to uniformly disperse the carbon nanomaterial with respect to PTFE derived from fine powder, which has been difficult in the prior art, and to obtain a flexible molded article in which occurrence of molding cracks and reduction in mechanical properties are reduced.

The resin molded article of the present embodiment has a use as a resin molded article for a chemical solution tube or the like used in the semiconductor field.

[Composite Resin Particles]

Hereinafter, the composite resin particles, which is an embodiment according to the present invention, will be described.

The composite resin particles of the present embodiment include the fine powder derived from PTFE and the carbon nanomaterial. In the composite resin particles, it is preferable that the carbon nanomaterial be uniformly attached to the fine powder.

The composite resin particles of the present embodiment include the following aspect.

Composite resin particles containing PTFE derived from the fine powder and the carbon nanomaterial, wherein the composite resin particles have a volume resistivity of $1.0 \times 10^9$ $\Omega \cdot$cm or less.

The amount of PTFE in the composite resin particles of the present embodiment is preferably 98 to 99.8% by mass with respect to 100% by mass of the composite resin particles. When the amount of PTFE is equal to or more than the lower limit value, the mechanical strength, heat resistance, flexibility, and the like of the composite resin particles of the present embodiment are likely to be excellent. When the amount of PTFE is equal to or less than the upper limit value, the moldability of the composite resin particles of the present embodiment will be easy to be excellent.

The amount of the carbon nanomaterial in the composite resin particles of the present embodiment is preferably 0.01 to 0.5% by mass with respect to 100% by mass of the composite resin particles. When the amount of the carbon nanomaterial is equal to or more than the lower limit value, the conductivity of the composite resin particles of the present embodiment is likely to be excellent. When the amount of the carbon nanomaterial is equal to or less than the upper limit value, the physical properties derived from PTFE of the composite resin particles of the present embodiment are hardly impaired. In addition, the composite resin particles of the present embodiment can contain a well-known dispersant, and the like as an arbitrary component.

The volume resistivity of the composite resin particles of the present embodiment is $1.0 \times 10^9$ $\Omega \cdot$cm or less, preferably $1.0 \times 10^7$ $\Omega \cdot$cm or less, and more preferably $1.0 \times 10^5$ $\Omega \cdot$cm or less. When the volume resistivity is $1.0 \times 10^9$ $\Omega \cdot$cm or less, the conductivity of the molded article obtained from the composite resin particles of the present embodiment is easily excellent.

The composite resin particles of the present embodiment can be produced in accordance with the description in the section of "[Method of Producing Composite Resin Particles]" of the present embodiment described above.

While the embodiments of the present invention have been described in detail above, the present invention is not limited to such specific embodiments. Moreover, addition, omission, substitution, and other modifications of the configuration may be added to the present invention within the scope of the gist of the present invention described in the claims.

The technical scope of the present invention is not limited to the above embodiments, and various modifications can be made without departing from the scope of the present invention.

For example, the ketone-based solvent may contain known solvents such as water and alcohol solvents as long as the effects of the present invention are not impaired.

EXAMPLES

Hereinafter, the effects of the present invention will be described in detail with reference to Examples and Comparative Examples. The present invention is not limited to the contents of the following Examples.

Examples 1 and 2, and Comparative Example 1

First, 5 g of PTFE fine powder and 20 g of 2-butanone were placed in a beaker, and the beaker was bathed in an ice bath and stirred with a magnetic stirrer while maintaining the temperature of the 2-butanone at 10° C. or lower. While stirring with the magnetic stirrer, using an ultrasonic disperser ("UH-50" manufactured by MST) under conditions of an output of 50 W and a frequency of 20 kHz, the pulverizing time of each Example was changed as shown in Table 1. The PTFE fine powder was pulverized in 2-butanone to prepare a 2-butanone resin slurry.

TABLE 1

| | | Example 1 | Example 2 | Comparative Example 1 | Comparative Example 2 |
|---|---|---|---|---|---|
| Pulverizing method | | Ultrasonic wave and stirrer | Ultrasonic wave and stirrer | Ultrasonic wave and stirrer | Ultrasonic wave and stirrer |
| Pulverizing time | [min.] | 10 | 2 | 1 | 10 |
| Particle diameter of resin particles after pulverizing | [μm] | 23 | 46.1 | 64 | 49.7 |
| Presence or absence of ice batch | | Presence | Presence | Presence | Absence |
| Temperature while pulverizing | [° C.] | <10 | <10 | <10 | 47 |
| CNT composite resin molded article | Releasability from mold | Good | Good | Good | Bad |
| | Volume resistivity [Ω · cm] | 1.39E2 to 2.00E2 | 1.63E2 to 2.90E2 | 1.94E2 to 8.12E3 | 1.31E2 to 8.16E2 |
| | Number of resin aggregates [pieces/cm²] | 3.5 | 4.1 | 6.7 | 9.7 |
| | Number of CNT aggregates [pieces/cm²] | 0 | 0.2 | 2.9 | 2 |

Next, a CNT dispersion in which the CNTs were dispersed in 2-butanone so as to have a CNT concentration of 0.2% by mass was prepared. 1.25 g of the CNT dispersion was added to the 2-butanone resin slurry prepared in the pulverizing step. The mixture was stirred for 10 minutes using a magnetic stirrer to prepare a CNT composite resin slurry.

2-butanone in the CNT composite resin slurry was removed, and the slurry was dried to obtain CNT composite fluororesin powder (the amount of CNT: 0.05% by mass) as composite resin particles.

The volume resistivity of the CNT composite fluororesin powder obtained in Examples 1 and 2 was measured at a plurality of locations. The volume resistivity was in a range of $1.2\times10^7$ to $6.7\times10^7$ Ω·cm.

5 g of the composite resin particles obtained were filled in a mold, gradually pressurized by a molding machine ("manual type 5 ton table press" manufactured by Sansho Industry Co., Ltd.), kept at a pressure of 40 MPa for 1 minute to perform compression pre-molding, and thereby a CNT composite fluororesin molded article (φ: 30 mm, thickness: 3 mm) was obtained.

Comparative Example 2

CNT composite fluororesin powder was produced in the same manner as in Example 1 except that the ice bath was not performed. The obtained CNT composite fluororesin powder was divided into fiberized gel lumps and powdery powder.

The CNT composite fluororesin powder including the fiberized gel lumps was filled into a mold and compression pre-molding was carried out, but the pre-molded article was not easily removed from the mold. A preliminary molded article was forcibly taken out and an evaluation sample was obtained.

"Volume Resistivity"

The volume resistivity of the obtained CNT composite fluororesin molded articles or the molded article of Comparative Example 2 was measured according to the following description.

The volume resistivity was measured using a resistivity meter ("Loresta GP MCP-T610 type" manufactured by Mitsubishi Chemical Analytech Co., Ltd., four-terminal method). The measurement results are shown in Table 1.

"Releasability from Mold"

After compression pre-molding with the mold, a case in which the pre-molded article was easily removed from the mold was evaluated as "Good", and a case in which the pre-molded article was not easily removed from the mold was evaluated as "Bad".

"Appearance Uniformity"

The appearance uniformity of the obtained CNT composite fluororesin molded articles and the molded article of Comparative Example 2 was determined according to the following description.

In visual appearance inspection, a case in which the number of the resin aggregates having a size of 1 mm or more is 5.0 pieces/cm$^2$ or less, and the number of the CNT aggregates having a size of 1 mm or more is 1.0 pieces/cm$^2$ was determined as "Good", and the other cases were determined as "Bad".

As shown in Table 1, the volume resistivity of the CNT composite fluororesin molded article of Example 1 was in a range of $1.39\times10^2$ Ω·cm to $2.00\times10^2$ Ω·cm. The volume resistivity of the CNT composite fluororesin molded article of Example 2 was in a range of $1.63\times10^2$ Ω·cm to $2.90\times10^2$ Ω·cm. In contrast, the volume resistivity of the CNT composite fluororesin molded article of Comparative Example 1 was in a range of $1.94\times10^2$ Ω·cm to $8.12\times10^3$ Ω·cm. The fluctuation range of the numerical value of was large. Thereby, it is suggested that the CNTs in the composite resin particles of Examples 1 and 2 were uniformly adhered to the fine powder as compared with Comparative Example 1.

As shown in Table 1, the appearance uniformity of the CNT composite fluororesin molded articles of Examples 1 and 2 was good. On the other hand, the aggregation was conspicuous, and the appearance uniformity was poor in the CNT composite fluororesin molded articles of Comparative Examples 1 and 2, compared with Examples 1 and 2. In Comparative Example 2, the fiberized gel lumps were observed. From this, it is suggested that the physical properties of the fine powder were impaired in the CNT composite fluororesin molded article of Comparative Example 2.

INDUSTRIAL APPLICABILITY

The method for producing composite resin particles of the present invention is highly applicable when applied to the production of conductivity fluororesin used in extrusion molding. Such conductivity fluororesin is used for extrusion molding, and is used for a chemical solution tube used for the purpose of preventing electrification in the semiconductor field.

The invention claimed is:

1. A method for producing composite resin particles, wherein the method includes:
a first step in which fine powder containing polytetrafluoroethylene obtained by emulsion polymerization is pulverized in the presence of a ketone-based solvent;
a second step in which the pulverized fine powder and a carbon nanomaterial are dispersed in the ketone-based solvent to produce a composite resin particles dispersion;
a third step in which the composite resin particles are produced by removing the ketone-based solvent from the composite resin particle dispersion,
wherein the fine powder is pulverized using ultrasonic waves so as to have an average particle diameter of 50 μm or less, and a temperature of the ketone-based solvent used in the first step is set to 20° C. or less, and
wherein the carbon nanomaterial is carbon nanotubes.

2. The method for producing composite resin particles according to claim 1, wherein a concentration of the carbon nanomaterial is 0.01 to 0.5% by mass with respect to a total of 100% by mass of the carbon nanomaterial and the fine powder.

3. The method for producing composite resin particles according to claim 1, wherein the ketone-based solvent contains at least one selected from the group consisting of 2-butanone, acetone, diethyl ketone, methyl propyl ketone, and cyclohexanone.

4. A Resin molded article molded using composite resin particles produced by the method for producing composite resin particles according to claim 1.

5. Composite resin particles, which are produced by the method for producing composite resin particles according to claim 1, containing polytetrafluoroethylene derived from fine powder containing polytetrafluoroethylene obtained by emulsion polymerization, and a carbon nanomaterial, and a volume resistivity of the composite resin particles is $1.0\times10^9$ Ω·cm or less.

6. The method for producing composite resin particles according to claim 2, wherein the ketone-based solvent contains at least one selected from the group consisting of 2-butanone, acetone, diethyl ketone, methyl propyl ketone, and cyclohexanone.

* * * * *